No. 11,975.
Reissued Mar. 11, 1902.
F. H. DAVIS.
TOWER.
(Application filed Aug. 15, 1901.)
2 Sheets—Sheet 1.
Fig. 1,
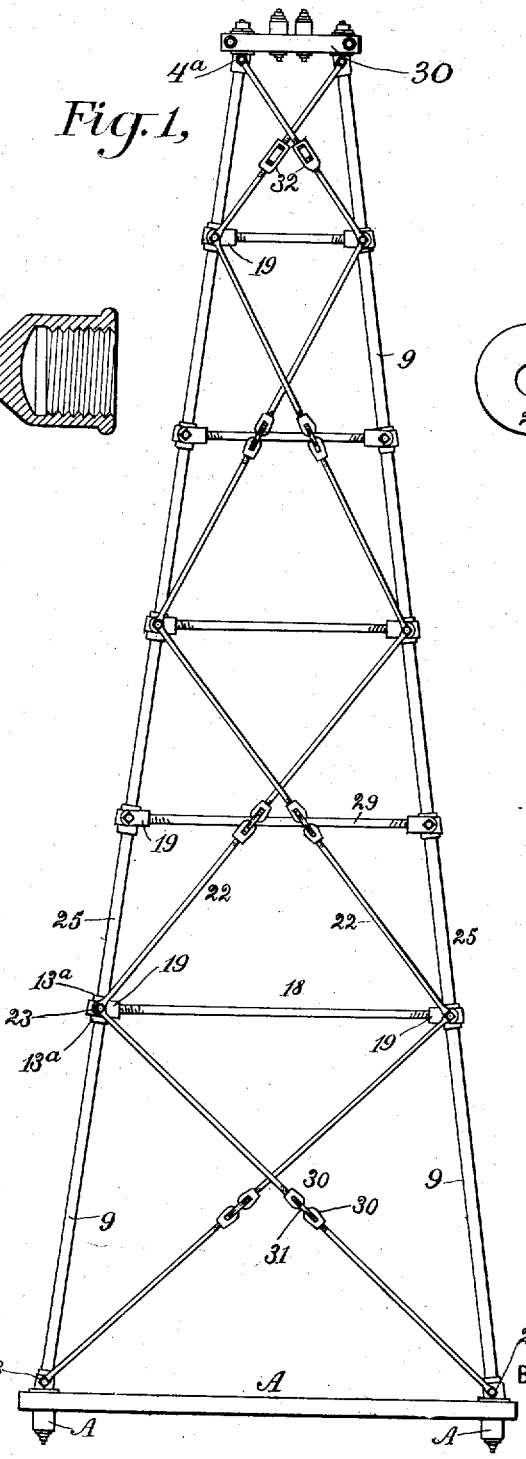
Fig. 9,
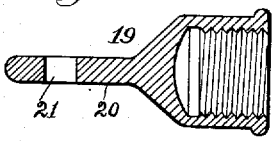
Fig. 10,
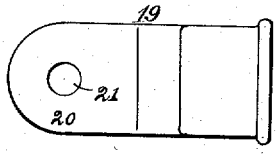
WITNESSES:
M. M. Conover.
A. N. Fiske.
INVENTOR
Francis Harby Davis
BY Chapin & Haywood
His ATTORNEYS No. 11,975.
Reissued Mar. 11, 1902.
F. H. DAVIS.
TOWER.
(Application filed Aug. 15, 1901.)
2 Sheets—Sheet 2.
Fig. 4,
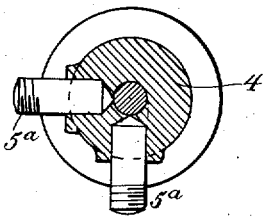
Fig. 2,
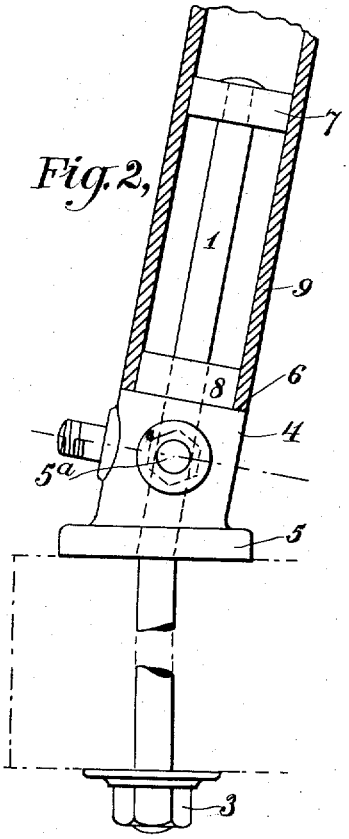
Fig. 6,
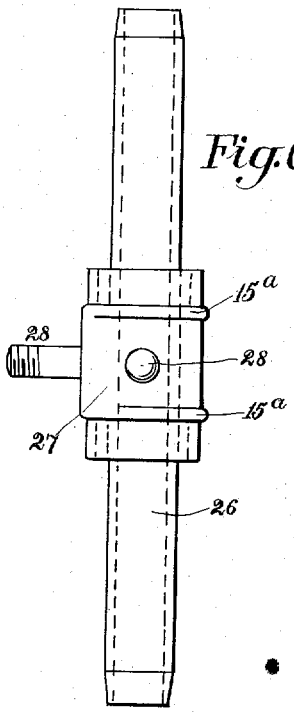
Fig. 3,
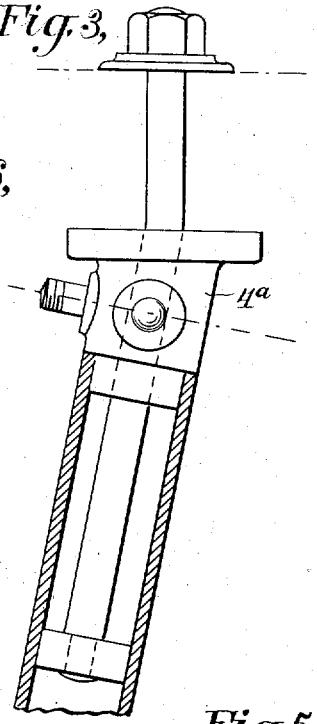
Fig. 5,
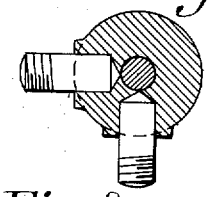
Fig. 7,
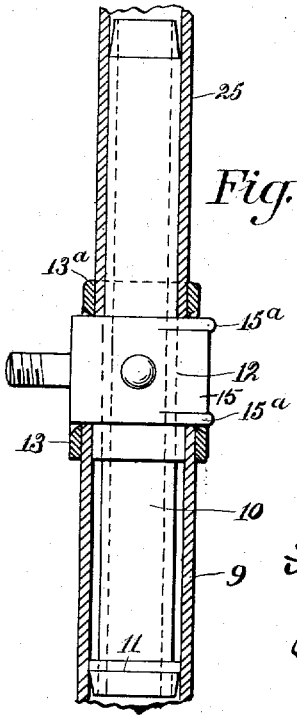
Fig. 8,
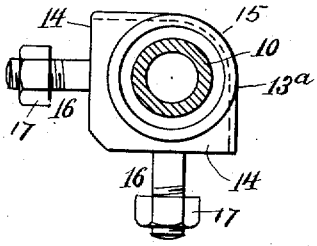
WITNESSES:
M. M. Conover.
A. H. Ferles.
INVENTOR
Francis Harley Davis
BY
Chapin & Haymard
His ATTORNEYS

UNITED STATES PATENT OFFICE.

FRANCIS HARLEY DAVIS, OF NEW YORK, N. Y., ASSIGNOR TO THE DAVIS CALYX DRILL COMPANY, OF NEW YORK, N. Y.

TOWER.

SPECIFICATION forming part of Reissued Letters Patent No. 11,975, dated March 11, 1902.

Original No. 642,588, dated February 6, 1900. Application for reissue filed August 15, 1901. Serial No. 72,191.

*To all whom it may concern:*

Be it known that I, FRANCIS HARLEY DAVIS, of the city of New York, in the county of New York and State of New York, have invented certain new and useful Improvements in Towers; and I do hereby declare the following to be a full, clear, and exact description of the invention, such as will enable others skilled in the art to which it appertains to make and use the same.

My invention relates to an improvement in derricks, one object of the invention being to provide a derrick which can be readily put together and taken apart and packed and shipped in a small space.

A further object is to provide a derrick which can be easily assembled and taken apart by unskilled parties.

A further object is to provide a derrick which will be simple in construction, cheap to manufacture, neat in appearance, and most effectual when in use.

With these objects in view the invention consists in certain novel features of construction and combination and arrangement of parts, as will be more fully hereinafter described, and pointed out in the claims.

In the accompanying drawings, Figure 1 is a side view illustrating my improvements. Fig. 2 is a view, partly in section, illustrating the means for fastening the lower end of the uprights to the base-timbers. Fig. 3 is a similar view of the upper ends of the uprights. Fig. 4 is a view in transverse section through one of the sleeves 4. Fig. 5 is a similar view of one of the sleeves 4ª. Figs. 6 and 7 are detail views of the couplings 12 and 27. Fig. 8 is a top plan view of one of the couplings 12. Figs. 9 and 10 are enlarged detail views of the heads 19 on the ends of the brace-rods 29.

A A represent timbers forming the foundation or one terminal of my improved tower or derrick. The derrick is constructed with three or four sides, and as all of said sides are precisely alike it will be necessary to illustrate and describe but one. Bolts 1 are passed through the respective ends of the timbers A and provided on their lower ends with nuts 3. The upper portion of each bolt 1 is bent inward, as shown, and made to project through an inclined sleeve 4, having a flat bearing-face 5, seated on the timber A, and the bolt is secured in place in the sleeve 4 by means of a screw 5ª, as shown. The upper portion of the sleeve 4 is contracted, as at 8, to form a shoulder 6, and the upper end of the bolt 1 is provided with a circular enlargement or nut 7, approximately the size of the contracted portion 8, and suitable legs or tubular uprights (the interior diameter of each of which is approximately the size of the contracted portion 8 of the sleeve and the enlargement 7 on the bolt) are slipped over said contracted portion 8 and enlargement 7 and are adapted to rest upon the shoulder 6 of the sleeves 4.

A tubular bar 10, having enlarged portions 11 thereon, is inserted into the upper end of each leg or upright 9 and projects upward any desired distance. A collar 12 is now placed in position on the bar 10, and said collar is provided on its lower edge with an annular flange 13 to receive the upper end of the leg or upright 9. Each collar 12 is also provided on its upper edge with an annular flange 13ª for the reception of the lower end of the next tubular section of the derrick, into which the upper portion of the bar 10 projects. Each collar 12 is made with flat side faces 14 and rounded inner face 15, preferably having ribs 15ª for the purpose of strengthening it. The collar 12 is provided on its flat side faces 14 with screw-threaded pins or bolts 16, adapted to receive any approved nut 17. Brace-rods or cross-arms 18, externally screw-threaded at their outer ends to receive an internally-screw-threaded head 19, having a flattened elongated bearing portion 20 thereon, are disposed horizontally, and the portion 20 of each head 19 is provided with a hole or opening 21 to receive the pin or bolt 16. Truss-rods 22, made in sections connected by turnbuckles 24 and provided at their ends with eyes or loops 23, are each secured at one end to a pin or bolt 16, said truss-rods being disposed diagonally and secured at their lower ends to the bottom sleeves. Each side of the lower part of the derrick is constructed as above described and shown, and when the turnbuckles 24 on all the truss-rods are tightened it will be seen the lower section of my improved derrick will be complete. Tubular sections or uprights 25 are now disposed on the upper ends of the bars 10, and similar bars 26 are disposed in the upper ends of the sections or uprights 25, and collars 27, similar to collars 12, are disposed on the bars and provided with pins or bolts 28, adapted to receive brace-rods 29, similar to brace-rods 18. Other tubular sections are disposed on the upwardly-projecting bars 26, and so on throughout the height of my improved derrick, which may comprise as many sections as may be desired. The upper ends of the uprights are provided with sleeves 4[a], similar to the lower sleeves 4, and are secured to a frame 30, of timber, which constitutes the upper terminal of the tower or derrick.

The turnbuckles of all except the top pairs of truss-rods comprise three links, the end links 30 having screw-threaded holes therein for the passage of the truss-sections, and the central link 31, connecting the end links, will permit the truss-rods to be folded into a small space for shipment. The turnbuckles for the top pairs of truss-rods comprise a single link 32, having screw-threaded holes at each end for the reception of the rod-sections. These top truss-rods are so short that it is not necessary to use the foldable turnbuckle, as the complete top truss-rods are practically no longer than one-half of the other truss-rods, and hence will occupy no more space than the other truss-rods when folded.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a tower, the combination of a series of uprights, each made in detachable tubular sections, a sleeve disposed between each two sections, and having internal shoulders forming abutments for the ends of said sections, a bar passing through each sleeve and projecting a distance above and below the same into the tubular sections of the upright, pins projecting outwardly from each sleeve, horizontal cross-braces removably attached at their ends to said pins, and diagonal truss-rods detachably connected at their ends to the said pins.

2. In a tower or derrick, the combination with a terminal, of bolts passing through said terminal and projecting upwardly in an inclined direction from said terminal, sleeves seated on said terminal, through which said bolts pass and tubular uprights inclosing said bolts and seated on said sleeves.

3. A skeleton tower or derrick comprising a plurality of separable and superposed sections, each of which comprises legs or uprights, horizontal brace-rods, diagonal truss-rods, each comprising a turnbuckle, and couples between adjacent sections to which the horizontal brace-rods are connected, said couples having projecting pins and the truss-rods having eyes adapted to receive said pins, whereby the truss-rods are connected to said couples.

4. A collapsible derrick or skeleton tower comprising a plurality of uprights, each formed in separate sections, a coupling between adjacent sections in each upright, having projecting pins, horizontal brace-rods connecting a pair of couplings directly opposite on a side of the tower or derrick, and diagonal truss-rods also connecting a pair of couplings on a side of the tower or derrick and having eyes receiving said pins.

5. A collapsible derrick or skeleton tower consisting of a plurality of hollow sectional uprights, a coupling between adjacent sections, each of which couplings comprises a collar against which the ends of adjacent sections of the uprights bear, a bar formed separately from and held in said collar and having its end portions extending into the adjacent sections, horizontal brace-rods connecting a pair of couplings directly opposite on a side of the tower or derrick, and diagonal brace-rods also connecting a pair of couplings diagonally opposite on a side of the tower or derrick.

6. In a collapsible derrick or skeleton tower consisting of a plurality of hollow uprights, each formed in separate sections, the combination, with such sections, of couplings for connecting together adjacent sections, horizontal brace-rods, and diagonal truss-rods, said couplings comprising collars against which the ends of the said sections abut, and bars held in said collars and projecting into the ends of the adjacent sections; reinforcing-collars being likewise provided which receive and reinforce the ends of the sections abutting against said couplings.

FRANCIS HARLEY DAVIS.

Witnesses:
M. M. CONOVER,
J. C. CHAPIN.